Sept. 7, 1943.  J. A. GAYLORD  2,328,799
ROTARY PISTON MECHANISM
Filed July 19, 1941  7 Sheets-Sheet 1

INVENTOR.
Jay A. Gaylord,
BY
Attys.

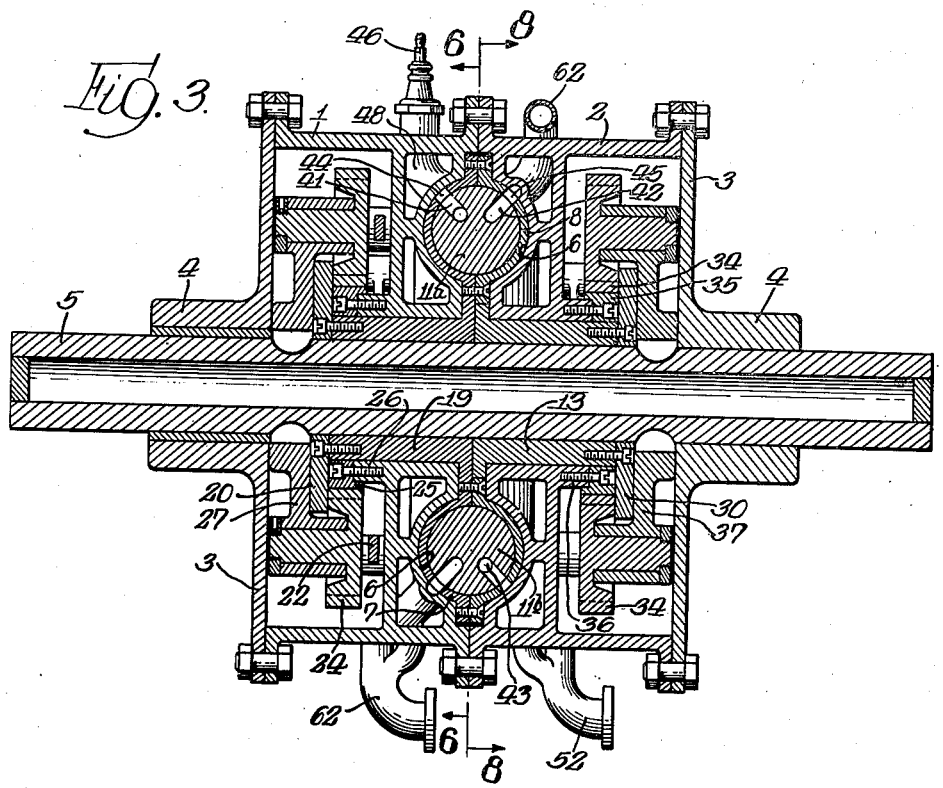
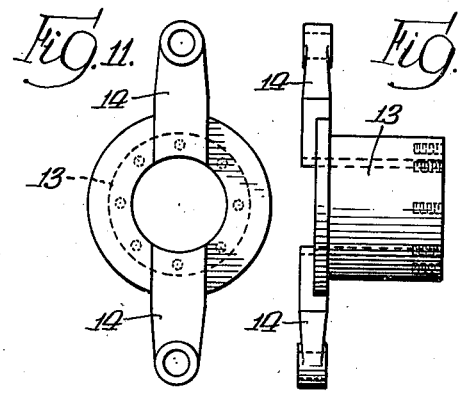
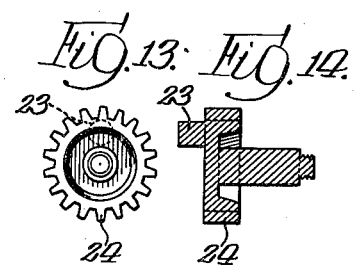

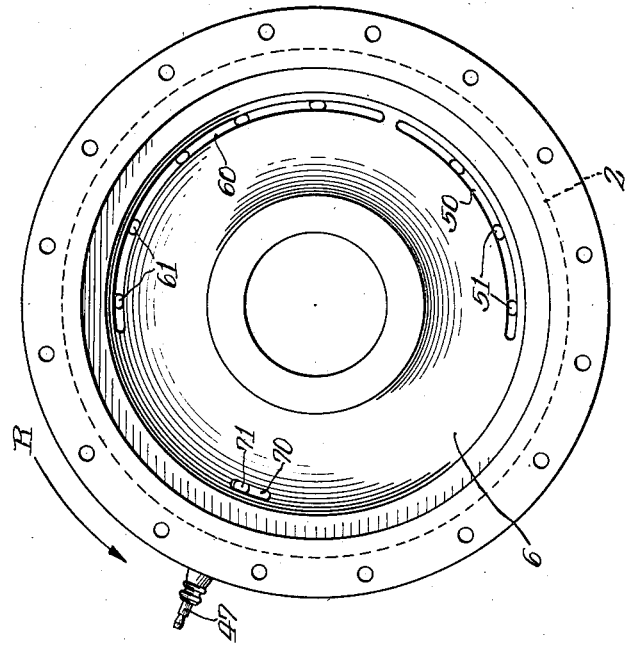
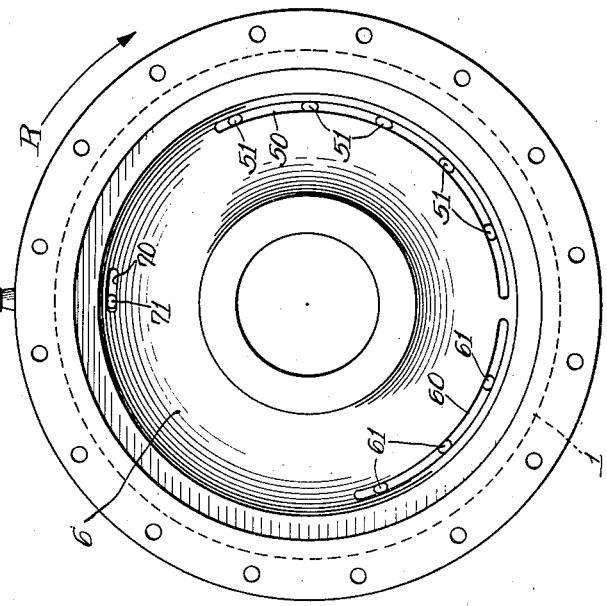

Sept. 7, 1943.　　　J. A. GAYLORD　　　2,328,799
ROTARY PISTON MECHANISM
Filed July 19, 1941　　　7 Sheets-Sheet 4
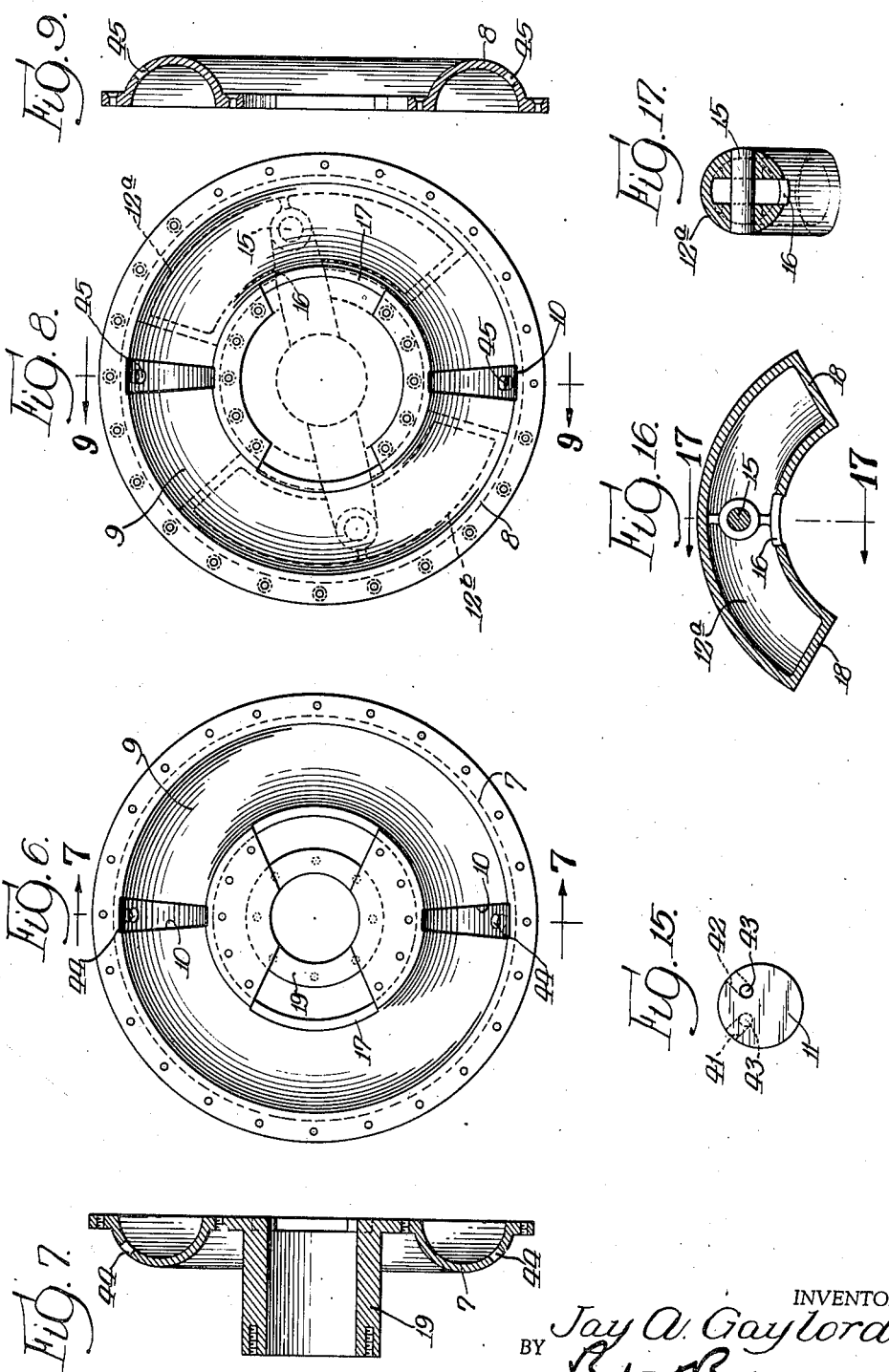
INVENTOR.
Jay A. Gaylord,
BY
attys.

Sept. 7, 1943.  J. A. GAYLORD  2,328,799
ROTARY PISTON MECHANISM
Filed July 19, 1941   7 Sheets-Sheet 5

INVENTOR.
Jay A. Gaylord,
BY
Attys.

Sept. 7, 1943.     J. A. GAYLORD     2,328,799
ROTARY PISTON MECHANISM
Filed July 19, 1941     7 Sheets-Sheet 6
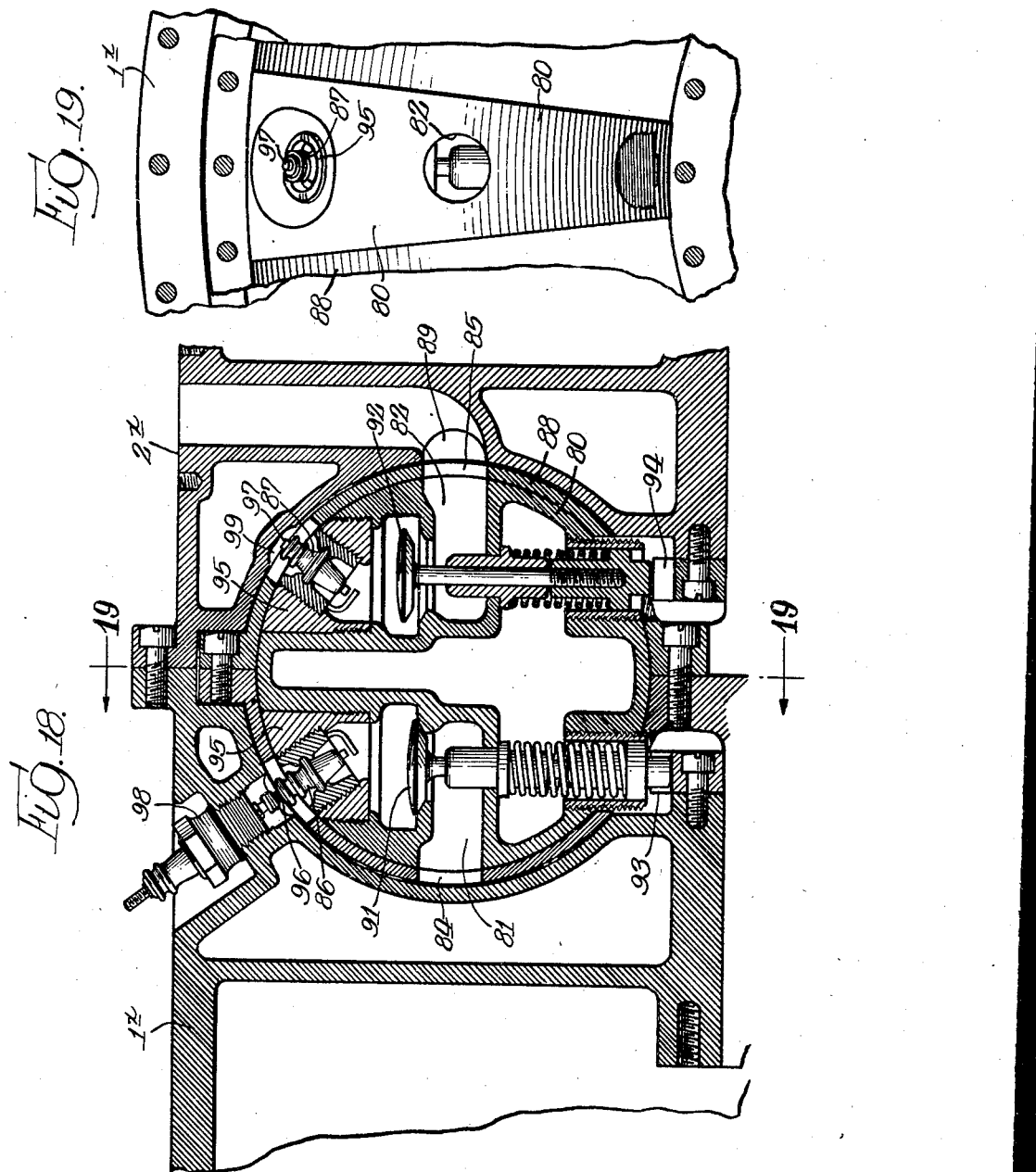
INVENTOR.
BY Jay A. Gaylord
Attys.

Sept. 7, 1943.  J. A. GAYLORD  2,328,799
ROTARY PISTON MECHANISM
Filed July 19, 1941   7 Sheets-Sheet 7
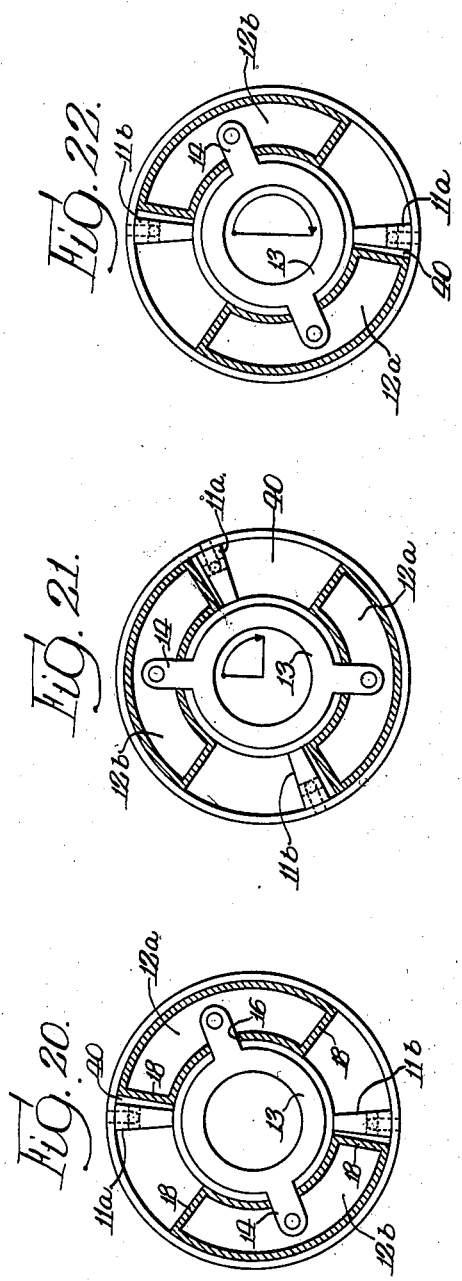
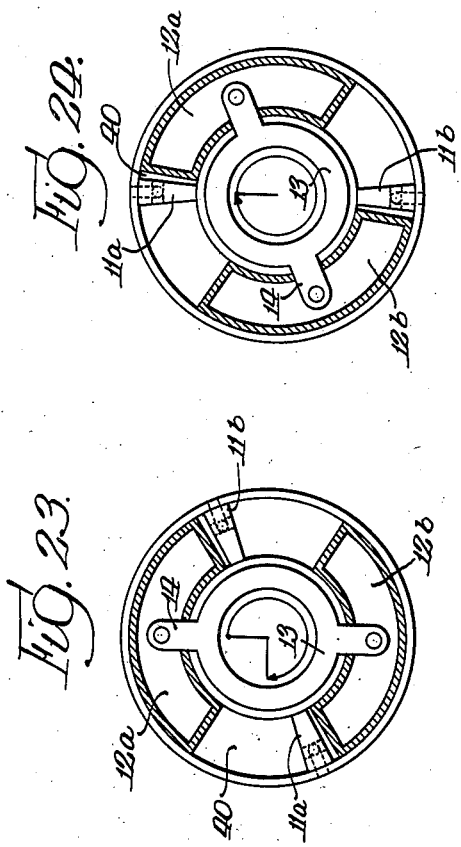
INVENTOR.
BY Jay A. Gaylord,
Attys.

Patented Sept. 7, 1943

2,328,799

UNITED STATES PATENT OFFICE 2,328,799

ROTARY PISTON MECHANISM

Jay A. Gaylord, Seattle, Wash.

Application July 19, 1941, Serial No. 403,192

17 Claims. (Cl. 123—43)

This invention relates to a rotary piston mechanism of the type adapted for use as an internal combustion engine, or, with slight modification, as a steam engine, or pump, or compressor, in which the working space which may serve as a suction chamber, expansion chamber, explosion chamber or as a pressure or compression space, is defined by elements which travel in a circular path around the main axis of the machine, which is also the axis of the power or drive shaft thereof.

One object of the invention is to provide a mechanism of this character which will be extremely light in proportion to the power or force developed or employed therein, and which will be relatively simple in construction, comprising a small number of working parts.

Another object of the invention is to provide a mechanism having one or more oscillating or reciprocating parts, but so arranged that said parts shall have a continuous rotary motion about the axis and always in the same direction, so that their inertia contributes to the stability and smoothness of operation of the machine.

It is a further object of the invention to provide a mechanism which includes pistons arranged to move in circular paths and each having two operative heads for cooperation with cylinder heads in forming two alternately operative working spaces. In addition, it is an object of the invention to provide a full formed gas-tight working annular cylinder in which high compression pressures can be developed as in conventional reciprocating mechanisms.

And it is also an object of the invention to provide a mechanism of the type which includes an annular cylinder and one or more pistons cooperating therewith, in which both the annular cylinder and the piston or pistons are mounted for rotation about the axis of a main shaft and within a fixed casing, so that the travel of the cylinder in the casing serves to control passages through which the fluid employed or operated upon by the machine is admitted to the cylinder and expelled therefrom.

Other objects and advantages of the invention will appear more fully from the following description taken in connection with the drawings in which:

Figure 3 is a vertical axial section taken substantially at the plane indicated by line 3—3 on Figure 2.

Figure 4 is an interior face view of the stationary annular cylinder, being taken at the plane of separation of the two sections of the casing, as indicated at line 4—4 on Figure 1.

Figure 5 is an interior face view of the stationary annular cylinder looking in the opposite direction, as indicated at line 5—5 of Figure 1.

Figure 6 is an interior face view showing one half of the rotary annular cylinder and taken as indicated at line 6—6 on Figure 3.

Figure 7 is an axial section of the part shown in Figure 6, being taken as indicated at line 7—7 on said figure.

Figure 8 is an interior face view of the other half of the rotary cylinder, being taken as indicated at line 8—8 on Figure 3.

Figure 9 is an axial section of the part shown in Figure 8, being taken as indicated at line 9—9 on said figure.

Figure 11 is a detail end view of the piston connecting rotor.

Figure 12 is a side view of the same.

Figure 13 is a detail view of one of the planetary gears.

Figure 14 is an axial section of the same showing its integral crank pin.

Figure 15 is a face view of one of the cylinder heads for the rotary cylinder.

Figure 16 is a transaxial sectional view of one of the pistons, being taken at the mid-plane thereof indicated at 6—6 on Figure 3.

Figure 17 is a transverse detail section taken as indicated at line 17—17 on Figure 16.

Figure 18 is a detail section on an enlarged scale, showing a modified construction of cylinder head with mechanically operated valves.

Figure 19 is a detail view taken as a section at line 19—19 on Figure 18.

Figure 1:
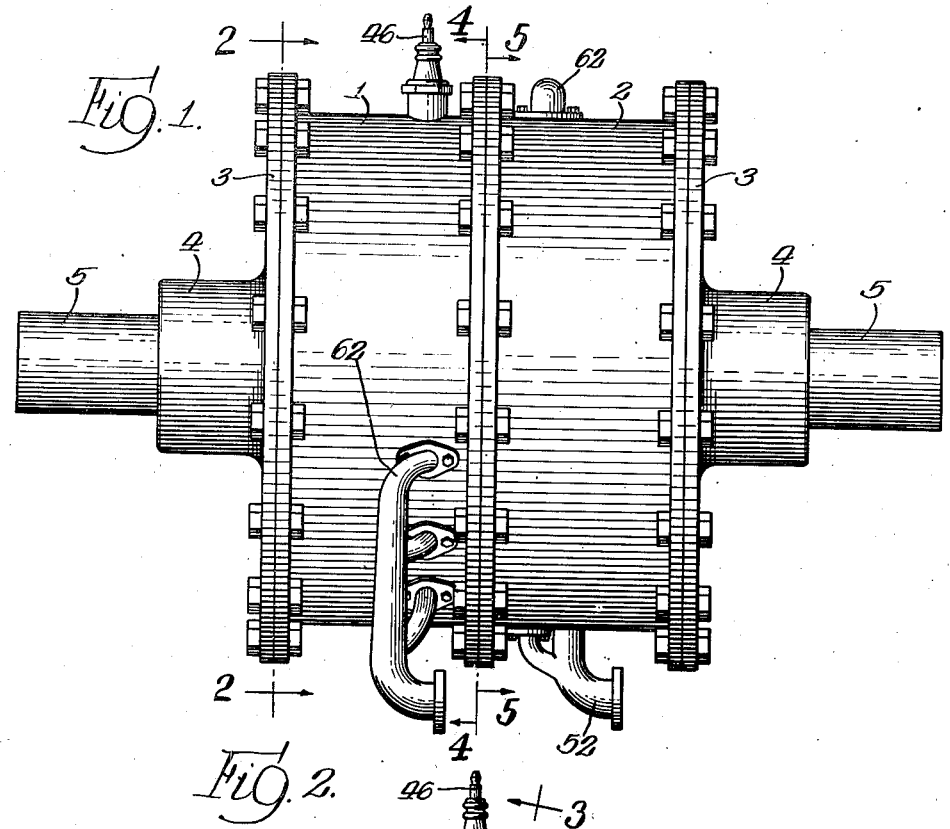
Figure 1 is an exterior side elevation of a rotary internal combustion engine embodying this invention.

Figures 20 to 24 inclusive, are diagrammatic views indicating the relative positions of the pistons and cylinder heads at successive quarter turns of the main shaft.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

The rotary internal combustion engine shown in the drawings as an embodiment of my invention is provided with an external stationary casing composed of two cylindrical flanged sections 1 and 2, with circular end plates 3, 3, all of said parts being bolted together to form a rigid structure. The end plates 3, 3 include hubs 4, 4 serving as journal bearings for the shaft 5 which is axially disposed in the casing. The sections 1 and 2 include annular channels 6, 6, as seen in Figures 4 and 5, which face each other when the sections are assembled, and which thus form an annular chamber or cylinder of substantially circular cross-section, as seen in Figure 3. Within this stationary toroidal bore there is rotatably mounted a hollow annular element, hereinafter referred to as the "rotary cylinder" and consisting of two halves 7 and 8, as shown in Figures 6 and 8 respectively. These halves are formed with peripheral flanges which may be secured face to face, as by screws, so that the annular channels 9, 9 of the two sections form an annular space of circular cross-section. Diametrically disposed grooves 10 are formed in the wall of the rotary cylinder for the securement of two heads or partitions 11a and 11b and in the two chambers thus formed there are carried curved pistons 12a and 12b of the shape indicated in Figures 16 and 17, said pistons being of circular cross-section, and each comprising a segment of an annulus which as shown, is somewhat more than 90 degrees in extent.

The two pistons are connected to each other by means of a rotor or rocker member shown in Figures 11 and 12, and comprising a sleeve or hub 13 with oppositely extending radial arms 14, 14, each bored at its outer end to engage a wrist pin 15 extending transversely through the piston as seen in Figure 16. Preferably, to avoid excessive weight, each of the pistons is of hollow formation, with a slot 16 providing clearance for the arm 14. As shown in Figures 6 and 8, the two halves of the rotary cylinder form arcuate clearance slots 17 for the arms 14 so as to permit limited travel of the pistons 12a and 12b in the arcuate spaces of the rotary cylinder; the location of the pistons and their connecting rocker are indicated in dotted outline in Figure 8. It may be understood that when this mechanism functions as an internal combustion engine the explosions occur in properly timed sequence between the fixed heads 11a and 11b of the rotary cylinder and both heads 18 of each piston, so that, in effect, the engine has four explosion chambers.

Figure 2:
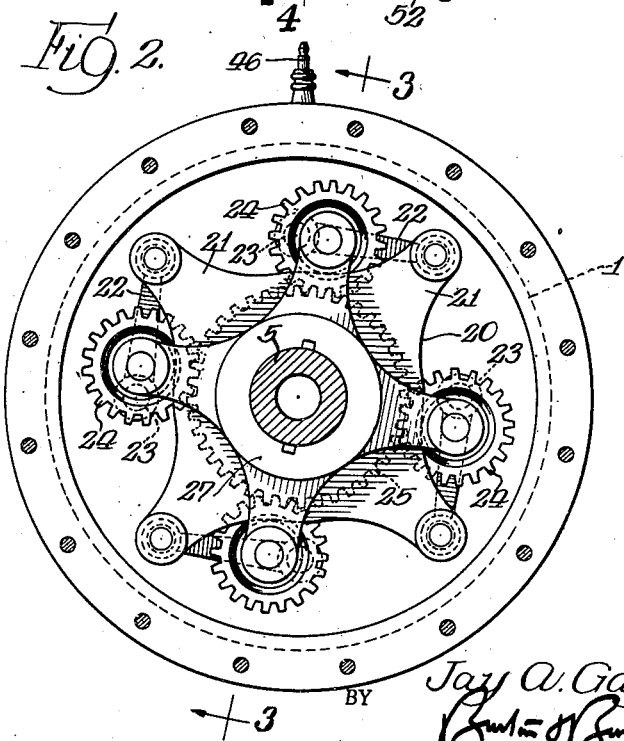
Figure 2 is a transverse section taken as indicated at line 2—2 on Figure 1.

The part 7 of the rotary cylinder includes a hub 19 which fits around the shaft 5 and extends into the gear housing space formed in the outer end portion of the section 1 of the casing. A crank plate 20 is secured to the end of the hub 19 by any suitable means, such as the screws shown in Figure 3, and each of the four arms 21 of the plate 20 is coupled by a pitman or connecting rod 22 to a crank 23 projecting from the face of a gear 24, as seen in Figure 2. The gears 24 are disposed in planetary relation to a central gear 25, which is stationary, being fixed to an annular flange 26 of the casing section 1. The planetary gears 24 are journaled on the arms of a spider 27 which is keyed to the shaft 5. Thus, as the gears 24 traverse the fixed central or sun gear 25 they carry with them the spider 27 and cause rotation of the shaft 5. Continuous travel of the gears 24 about the central gear 25 involves rotation of their respective cranks 23 and oscillation of the crank plate 20 relatively to the spider 27 which carries the gears 24. Such oscillation of the crank plate 20 involves similar oscillation of the rigidly connected "rotary cylinder," composed of the parts 7 and 8 and rigidly attached to the plate 20 by means of the hub 19.

Figure 10:
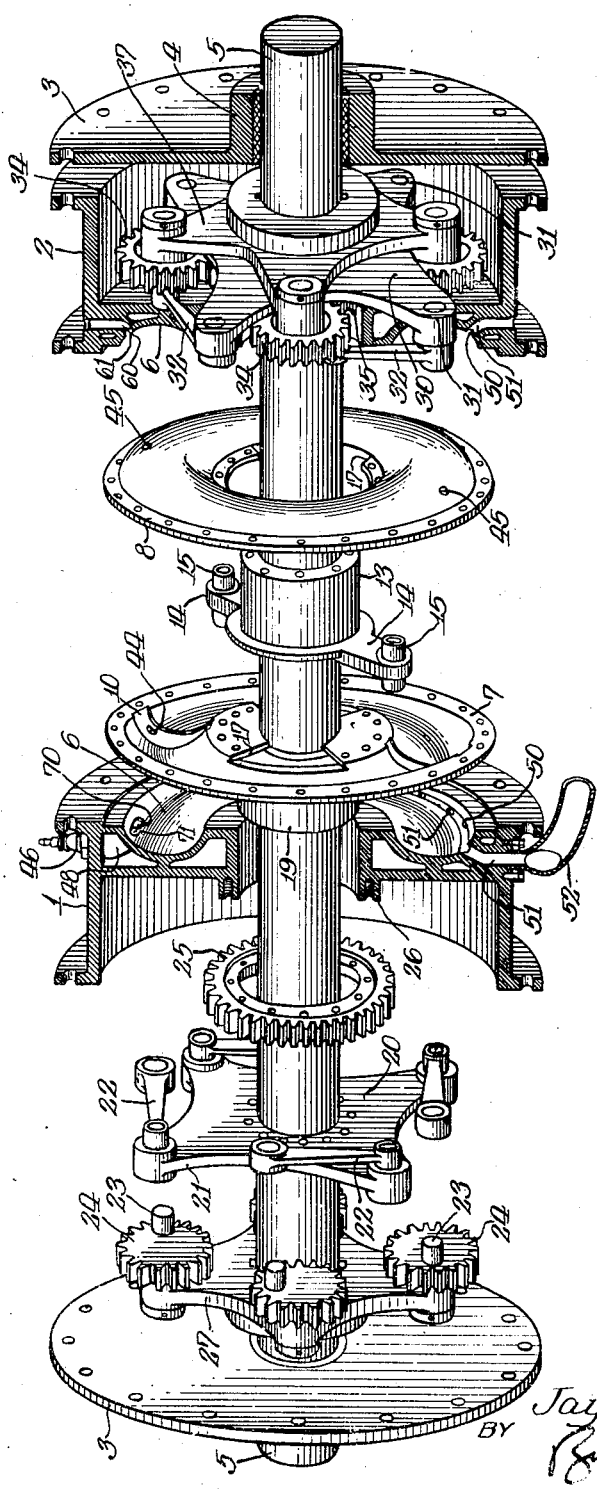
Figure 10 is a perspective view showing the principal elements of the engine separated along the axis of the shaft but in the same order of arrangement as that in which they are normally assembled; the pistons and piston heads are omitted from this view.

The hub 13 of the rocker which connects the pistons 12a and 12b is itself attached rigidly to a crank plate 30, having arms 31 similar to the arms 21 of the plate 20 and coupled by connecting rods 32 to crank pins on planetary gears 34 which are housed within a chamber in the part 2 of the engine casing. The gears 34 are mounted in planetary relation to a ring gear 35 which is secured fixedly to an annular flange 36 of the casing section 2; and the gears 35 are journaled on the arms of a spider 37 which is keyed to the shaft 5, as seen in Figures 3 and 10. Thus the travel of the planetary gears 34 about the fixed sun gear 35 will be accompanied by rotation of the shaft 5 in the same manner as the travel of gears 24 about the sun gear 25 involves rotation of said shaft. And such travel of the gears 34 will actuate the connecting rods 32 to cause oscillation of the crank plate 30 relatively of the spider 37, and corresponding oscillation of the pistons 12a, 12b, which are connected to the crank plate through the rocker hub 13 and its arms 14.

Since the spiders which carry the sets of planetary gears 24 and 34 are both anchored to the shaft 5, while the sun gears 25 and 35 are both fixed to the stationary casing of the engine, the oscillation of the pistons 12a, 12b and the oscillation of the rotary cylinder will occur in definitely timed relation, and by proper relative setting of the crank pins on the gears 24 and 34 respectively, the oscillation of these parts can be made equal and opposite. Preferably, the gears 24 and 34 are similar in size and in number of teeth, and each of them has a pitch diameter which is one-half that of the sun gear with which it meshes. Both sets of gears simultaneously traverse their sun gears in the same direction; hence, by setting the crank pins of the gears 24 at 180 degrees from the crank pins of the gears 34, the pistons 12a, 12b, will be caused to move in one direction while the relative movement of the rotary cylinder is in the opposite direction. Thus the piston heads 18 will alternately approach and recede from the heads 11a, 11b of the rotary cylinder, but, at the same time, both the cylinder and the piston will revolve about the axis of the shaft 5. Figures 20 to 24 indicate the relation of these parts at several stages in the cycle.

Considering the structure as an internal combustion engine, Figure 20 may be understood as showing the relative positions of piston 12a and the head 11a at the instant of ignition of the gas in the space 40 between said parts. After a quarter turn of the shaft 5 in clock-wise direction, the piston 12a will have moved ahead by somewhat more than a quarter turn, as seen in Figure 21, while the cylinder and its head 11a will have moved by something less than a quarter turn, as shown in Figure 21. The difference in rotative movement of these two parts results in expanding the space 40 between them; in the case of an internal combustion engine this space represents the extent to which the ignited motive fluid expands in driving the piston 12a away from the head 11a. During this quarter turn the crank pin to which the piston 12a is connected has been moving forward in the same direction as that in which the shaft 5 is rotating. But the crank pin to which the cylinder and its head 11a are connected has been traveling in an arc having a general direction opposite to that in which the shaft 5 rotates, so that the crank pin travel is added to the general rotation of the parts with the shaft 5, in the case of the piston, and subtracted from that rotation, in the case of the cylinder.

During the next quarter turn the opposite condition obtains; as seen in Figure 22, the cylinder head 11a moves through more than a quarter turn, while the piston 12a moves through less than a quarter turn, with the result that the cylinder head catches up with the piston. This may be considered the exhaust period of the cycle in which the space 40 between the parts in question is reduced to a minimum.

In the succeeding quarter turn, as indicated in Figure 23, the piston 12a moves away from the cylinder head 11a, again expanding the space 40 for the "intake stroke" of the cycle, and during the final quarter turn the cylinder head 11a catches up with the piston 12a in the "compression stroke," reducing the space 40 to a minimum as seen in Figure 24. Thereafter, the cycle is repeated, beginning with the ignition of the gas at 40 while the parts are in the positions shown in Figure 24; and the engine thus operates upon the conventional four-cycle principle.

Since the piston 12a is closed at both ends, providing heads 18 which cooperate respectively with the cylinder heads 11a and 11b, a similar cycle will be performed by the cylinder head 11b cooperating with the other end of piston 12a so that the piston itself will experience two explosions in each revolution of the shaft 5; likewise, the piston 12b will experience two explosions during a single revolution of the shaft, providing a total of four power impulses for each revolution. In a typical reciprocating engine with fixed cylinders operating on the four-cycle principle eight separate cylinders would be required to deliver four power impulses for each revolution of the crank shaft; thus the present mechanism, when employed as an internal combustion engine, is equivalent to an eight cylinder engine of the reciprocating type.

The supply of motive fluid to the spaces between the heads 11a, 11b of the rotary cylinder and the pistons 12a, 12b therein is accomplished by way of passages 41 and 42 formed in each of the heads and leading from openings in the periphery of the head to ports 43, 43 opening through opposite faces of the head, as indicated in Figures 3 and 15. The passages 41 and 42 register with ports 44 and 45 respectively in the side walls of the parts 7 and 8, which form the rotary cylinder, and as said cylinder rotates these ports traverse circumferentially elongated channels 50 and 60 in the side walls of the casing sections 1 and 2. Each of the channels 50 connects a series of exhaust ports 51 which lead externally into a suitable manifold 52 adapted for connection to an exhaust pipe or muffler, not shown. Each of the channels 60 connect several inlet ports 61 leading from an externally mounted manifold 62 which may be coupled to any suitable source of explosive motive fluid such as a carbureter, not shown. As the annular cylinder turns in the casing its ports 44 and 45 communicate temporarily with the channels 60 during the intake portion of the cycle, and with the channels 50 during the exhaust portion of the cycle.

Each half of the casing is also equipped with a spark plug, the section 1 carrying the plug 46 and the section 2 carrying the plug 47, as seen in Figures 4 and 5. The side walls of the casing sections 1 and 2 are formed with short channels 70 which are positioned to register respectively with the ports 44 and 45 in the annular rotary cylinder; in each case such registration occurs at the instant when the motive fluid has been compressed between a cylinder head and a piston, ready for ignition. The cored passage 48 in which the spark plug 46 is mounted opens at 71 into the channel 70 in section 1 of the casing, as seen in Figure 4; and, similarly, the cored passage in which the spark plug 47 is mounted opens at 71 into the channel 70 of section 2 of the casing, as seen in Figure 5.

Thus with the channels positioned in section 1 of the casing as shown in Figure 4, ignition by means of spark plug 46 occurs as the cylinder head 11a registers with the channel 70, and expansion of the motive fluid continues until the cylinder head reaches one end of the channel 50. For something more than 90 degrees the cylinder head then travels in communication with the channel 50 and the exhaust ports 51, while the piston 12a is approaching the head 11a in the exhaust portion of the cycle. As the intake period begins the port 44 of the cylinder arrives opposite one end of the passage 60 and remains in registration therewith and in communication with the ports 61 and intake manifold 62 during the entire intake period, while the piston and the cylinder head are separating to produce suction for filling the chamber 40 with fresh gas. Thereafter, the port 44 is closed by registration with the unbroken surface of the wall or channel 6 in section 1 of the casing, while the gas is being compressed and until registration with the channel 70 is again effected, thus releasing a small portion of the compressed gas through the port 71 and into contact with the spark plug 46 for ignition thereby.

Each of the ports 45 goes through a similar cycle as it registers with the channels 70, 50 and 60 of the opposite section 2 of the fixed casing, commencing with the ignition of the charge by the spark plug 47, and, as will be noted by a comparison of Figures 4 and 5, the spark plugs 46 and 47 are spaced angularly from each other by the proper amount to insure that the four power impulses in each revolution will occur at 90-degree intervals in the rotation of the main shaft 5.

If desired, instead of relying upon the registration of the ports 44 and 45 with the passages 50, 60 and 70 for timing the intake and exhaust portions of the cycle, each of the cylinder heads may be fitted with mechanically actuated valves. Figures 18 and 19 illustrate such a modified construction, showing one of the cylinder heads 80 having cored passages 81 and 82 corresponding respectively to the passages 41 and 42 previously described, and registering respectively with ports 84 and 85 in the side walls of the cylinder 88. Suitable channels, such as that indicated at 89, will be provided in the side walls of the fixed casing composed of sections 1ˣ and 2ˣ, such channels corresponding to the channels 50, and 60 of the structure already described. The ports which lead respectively through the front and rear faces of the head 80 are controlled by valves 91 and 92 which are of the poppet valve type, commonly employed in internal combustion engines. The stems of these valves are provided with tappets which engage cam rings 93 and 94 which are fixed respectively to the casing sections 1× and 2× so that as the cylinder 88 revolves in the casing the valve tappets traverse the cams and the valves are opened and closed with the desired timing.

As a further modification, each head 80 may carry its own spark plugs 86 and 87, each mounted in a suitable bushing 95 secured in the head. Thus the plugs 86 and 87 will travel with the cylinder 88 as it rotates, but their central electrodes 96 and 97 will be energized momentarily by contact with registering conductors of fixed plugs, such as that shown at 98 in Figure 18.

It will be evident that the mechanism which includes the casing, the rotary annular cylinder and the oscillating pistons together with the gearing which controls the oscillatory motion, may be adapted by very slight changes to operate as a steam engine or as a pump or compressor. This will involve omitting the spark plugs and altering the exhaust and inlet channels 50 and 60 so as to provide simply for alternate intake and exhaust of the steam, air, or other fluid to be handled by the mechanism.

But considered as an internal combustion engine, the mechanism has certain definite advantages over previous types. It will develop higher compression because the pistons work in a full formed gas-tight annular cylinder, instead of having an annular cylinder formed of several working parts which are difficult to keep gas tight. This engine is also comparatively simple to manufacture; it can be made relatively light in weight in relation to horse power developed; and for aeroplane use it has a very small frontal area in proportion to its power.

I claim:

1. In a machine of the character described having a stationary casing with an annular bore and a main shaft journaled at the axis thereof, an annular cylinder rotatably fitted in said bore and provided with a head, a pair of pistons slidably fitted in said cylinder at opposite sides of said head, gearing connecting the cylinder and pistons to the shaft and operative to oscillate the pistons in the cylinder in timed relation to each other when the shaft revolves, the head having a pair of separate passages opening respectively through its opposite faces and leading to ports in the cylinder wall, and ports in the casing positioned to register for limited periods with said ports of the cylinder as the cylinder rotates.

2. In a machine of the character described having a stationary casing with an annular bore and a main shaft journaled at the axis thereof, an annular cylinder rotatably fitted in said bore, and provided with a plurality of heads partitioning it into separate chambers, a piston slidable in each chamber, gearing connecting the cylinder and pistons to the shaft and operative to oscillate the pistons in said chambers when the shaft revolves, each piston having a closed head at each end adapting the piston to cooperate with both cylinder heads between which it oscillates and each head having a pair of separate ports opening respectively through its opposite faces together with connecting passages for admitting fluid to the chambers of the cylinder and releasing fluid therefrom by way of said ports.

3. In a machine of the character described having a stationary casing with an annular bore and a main shaft journaled at the axis thereof, an annular cylinder rotatably fitted in said bore and provided with a head, gearing in the casing at one side of said cylinder with means extending rigidly from the cylinder into connection with said gearing, and additional gearing in the casing at the other side of said cylinder, the cylinder having a slot in its inner periphery, an arm connected to the piston and extending through said slot with means extending rigidly from said arm into connection with the additional gearing, both sets of gearing being connected to the shaft, one set operating to oscillate the piston and the other set operating to oscillate the cylinder when the shaft revolves.

4. In a machine of the character described having a casing with a main shaft journaled therein, an annular cylinder mounted for rotation co-axially with said shaft, said cylinder having a pair of heads partitioning it into two chambers, a piston slidable in each chamber between said heads, the cylinder having a slot in its inner periphery opening into each chamber but covered by the piston therein, a hub journaled at the axis of the annular cylinder and having a pair of arms extending through said slots respectively and attached to said pistons, and gearing connecting said hub to the shaft operative to oscillate the hub and thereby oscillate the pistons in said cylinder when the shaft revolves.

5. In a machine of the character described having a casing with a main shaft journaled therein, an annular cylinder mounted for rotation co-axially with said shaft, said cylinder having a pair of heads partitioning it into two chambers, a piston slidable in each chamber between said heads, the cylinder having a slot in its inner periphery opening into each chamber but covered by the piston therein, a hub journaled at the axis of the annular cylinder and having a pair of arms extending through said slots respectively and attached to said pistons, a hub secured to the annular cylinder at its axis, and gearing connecting both hubs to the shaft operative to oscillate the cylinder and pistons oppositely in timed relation to each other when the shaft revolves.

6. In a machine of the character described having a casing with a main shaft journaled therein, an annular cylinder mounted for rotation co-axially with said shaft, said cylinder having a pair of heads partitioning it into two chambers, a piston slidable in each chamber between said heads, the cylinder having a slot in its inner periphery opening into each chamber but covered by the piston therein, a hub journaled at the axis of the annular cylinder and having a pair of arms extending through said slots respectively and attached to said pistons, a hub secured to the annular cylinder at its axis, and planetary gearing including a pair of planet gears each having a crank, a crank plate on each of said hubs and pitmen connecting said crank plates to the cranks of the planet gears, respectively, together with spiders supporting the planet gears and secured rigidly to the shaft whereby the cylinder and its pistons are oscillated in timed relation to each other when the shaft revolves.

7. In a machine of the character described having a stationary casing with an annular bore and a main shaft journaled at the axis thereof, an annular cylinder rotatably fitted in said bore and provided with a plurality of heads partitioning it into separate chambers, a piston slidable in each chamber, gearing connecting the cylinder and pistons to the shaft and operative to oscillate the pistons in said chambers when the shaft revolves, each piston having a closed head at each end adapting the piston to cooperate with both cylinder heads between which it oscillates and each head having a pair of separate ports opening respectively through its opposite faces, said ports connecting with separate passages which extend laterally in the head and through the cylinder wall, the contacting bore of the casing having channels which register respectively with said passages for limited periods in timed relation to the oscillation of the pistons as the cylinder rotates, whereby said channels serve as inlet and exhaust passages for the spaces between the pistons and the cylinder heads.

8. In a machine of the character described, a stationary casing having an annular bore, a main shaft journaled at the axis thereof, an annular cylinder rotatable in said bore and provided with a head, a piston slidable in the cylinder toward and from said head, gearing inter-connecting said casing, cylinder, piston and shaft and operative to cause the cylinder and piston to travel about the shaft axis while oscillating oppositely in timed relation to each other when the shaft revolves, a passage in the cylinder head opening into the cylinder from a port in the cylinder wall which registers with ports in the casing as the cylinder rotates in the bore thereof, and a valve in said cylinder head controlling said passage together with an actuating cam for said valve fixed in the casing adjacent the said bore in which the cylinder rotates.

9. In a rotary internal combustion engine, a stationary casing having an annular bore, a main shaft journaled at the axis thereof, an annular cylinder rotatably fitted in said bore and provided with a head, a piston slidable in the cylinder toward and from said head, gearing inter-connecting said casing, cylinder, piston and shaft and operative to cause the cylinder and piston to travel about the shaft axis while oscillating oppositely in timed relation to each other when the shaft revolves, a port in the cylinder wall and channels in the bore of the casing positioned to register successively with said port as the annular cylinder rotates in the casing, said channels serving as intake and exhaust passages for motive fluid and products of combustion, and at least one channel leading to an igniting device supported in the casing.

10. In a rotary internal combustion engine, a stationary casing having an annular bore, a main shaft journaled at the axis thereof, an annular cylinder rotatable in said bore and provided with a head, a piston slidable in the cylinder toward and from said head, gearing inter-connecting said casing, cylinder, piston, and shaft and operative to cause the cylinder and piston to travel about the shaft axis while oscillating oppositely in timed relation to each other when the shaft revolves, a passage in the cylinder head opening into the cylinder from a port in the cylinder wall which registers with ports in the casing as the cylinder rotates in the bore thereof, a valve in said cylinder head controlling said passage, an actuating cam for said valve fixed in the casing adjacent the said bore in which the cylinder rotates, together with a spark plug mounted in said head of the cylinder in communication with said passage and a fixed electrical contact carried by the casing and exposed in the annular bore thereof for momentary energizing contact with said spark plug in timed relation to the piston movement as the cylinder rotates.

11. In a machine of the character described, a rotatably mounted shaft, a rotatable cylinder in the form of a closed ring having an annular bore and including an axially disposed hub by which the cylinder is supported on the shaft, pistons in the cylinder bore with means supporting them on the shaft independently of said cylinder and means connecting said pistons to the shaft and operative to cause them to oscillate in the cylinder while said cylinder rotates about the shaft axis.

12. In a machine of the character described, a rotatable cylinder composed of two disks oppositely dished and secured together forming an annular bore and including an axially disposed hub rigid with the disks and supporting the cylinder on the shaft, pistons in the cylinder bore with means supporting them on the shaft independently of said cylinder and means connecting said pistons to the shaft and operative to cause them to oscillate in the cylinder while said cylinder rotates about the shaft axis.

13. In a machine of the character described, a rotatably mounted shaft, a rotatable cylinder in the form of a closed ring having an annular bore and including an axially disposed hub by which the cylinder is supported on the shaft, said cylinder having an abutment head partitioning its bore into separate chambers, said head having a pair of separate ports opening respectively through its opposite faces into said chambers, pistons in said chambers and means connecting said pistons to the shaft and operative to cause them to oscillate in the chambers while said cylinder rotates about the shaft axis.

14. In a machine of the character described, a rotatably mounted shaft, a rotatable cylinder in the form of a closed ring having an annular bore and including an axially disposed hub by which the cylinder is supported on the shaft, pistons in the cylinder bore with means supporting them on the shaft independently of said cylinder, means connecting the cylinder to the shaft, and means connecting said pistons to the shaft, at least one of said means being operative to cause oscillation of its connected structure and both means serving to secure rotation of their connected parts about the shaft axis when said shaft rotates.

15. In a machine of the character described, a rotatably mounted shaft, a rotatable cylinder in the form of a closed ring having an annular bore and including an axially disposed hub by which the cylinder is supported on the shaft, said cylinder having abutment heads partitioning the cylinder bore into chambers, each head having a pair of separate ports opening respectively through its opposite faces into separate chambers for admitting fluid thereto and releasing fluid therefrom, each chamber having an arcuate slot open toward the shaft, a second hub on the shaft with arms extending into said slots, an arcuate piston in each chamber carried on one of the arms for oscillation between the abutment heads which define the chamber, and means connecting both hubs to the shaft and operative to cause such oscillation of the pistons accompanied by rotation of the cylinder about the shaft axis when the shaft rotates.

16. In a machine of the character described, a stationary casing having an annular bore, a rotary shaft journaled at the axis thereof, a cylinder in the form of a closed ring rotatably fitted into the bore of the casing, said cylinder having an annular bore with a head partitioning said bore and an axially disposed hub by which the cylinder is supported on the shaft independently of the casing, pistons in the cylinder bore at opposite sides of said head, a second hub on the shaft and means by which said hub supports said pistons independently of the cylinder for oscillation in said cylinder, gearing disposed at one side of the annular bore of said casing and operatively connecting one hub to the shaft, and additional gearing disposed at the other side of said bore of the casing and operatively connecting the other hub to the shaft, said gearing being operative to oscillate the cylinder and pistons in timed relation to each other when the shaft revolves in the casing.

17. In a machine of the character described, a stationary casing having an annular bore, a rotary shaft journaled at the axis thereof, a cylinder in the form of a closed ring rotatably fitted into the bore of the casing, said cylinder having an annular bore with a head partitioning said bore and an axially disposed hub by which the cylinder is supported on the shaft independently of the casing, pistons in the cylinder bore at opposite sides of said head, a second hub on the shaft and means by which said hub supports said pistons independently of the cylinder for oscillation in said cylinder, the casing including a housing adjacent one side of its annular bore, gearing disposed in said housing and operatively connecting one hub to the shaft, a second housing adjacent the other side of said annular bore of the casing and additional gearing disposed in said second housing and operatively connecting the other hub to the shaft, said two sets of gearing cooperating to oscillate the cylinder and pistons in timed relation to each other when the shaft revolves in the casing, together with a removable cover plate for each of said gear casings affording access to the gearing without disturbing the cylinders and pistons in the annular bore of the casing.

JAY A. GAYLORD.